April 27, 1943.                L. L. LEWIS                2,317,925
                                  GAUGE
                             Filed May 28, 1940
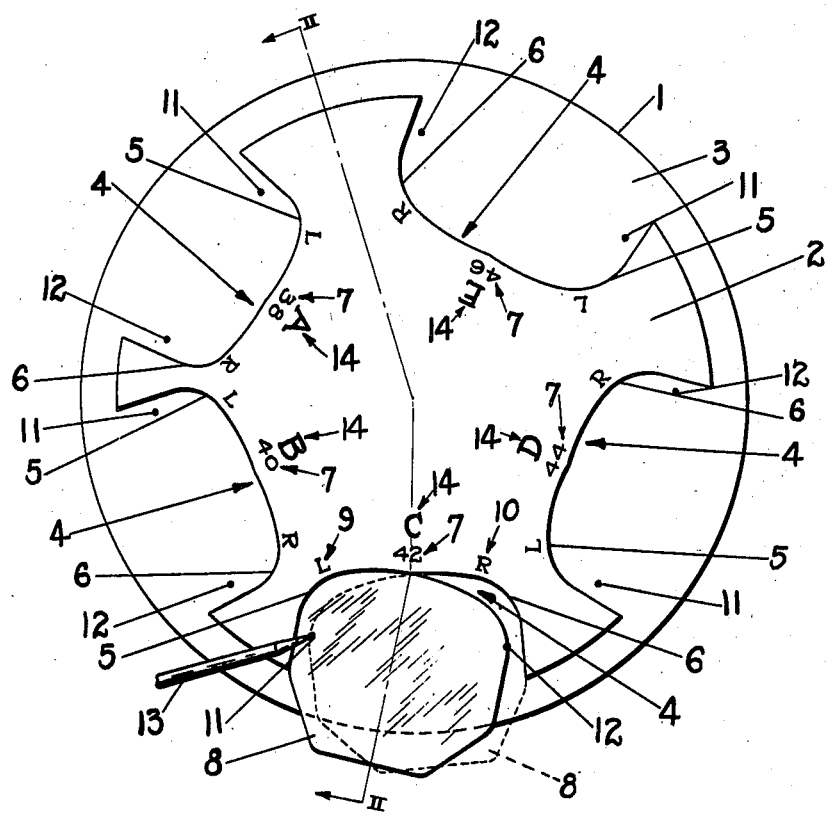
Fig. I
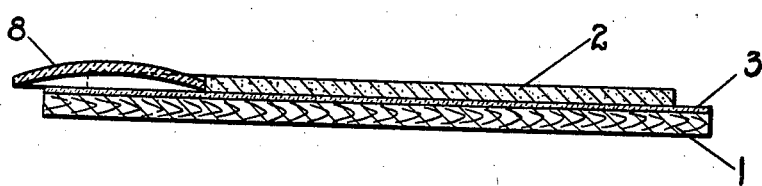
Fig. II
                                         INVENTOR.
                                  LAWRENCE L. LEWIS
                           BY
                              Harry H. Styll
                                         ATTORNEY.

Patented Apr. 27, 1943

2,317,925

UNITED STATES PATENT OFFICE 2,317,925

GAUGE

Lawrence L. Lewis, Tucson, Ariz., assignor to American Optical Company, Southbridge, Mass., a voluntary association of Massachusetts Application May 28, 1940, Serial No. 337,691

7 Claims. (Cl. 33—174)

This invention relates to improvements in gauge means and has particular reference to improved means and method of locating the positional relation at which the parts of an opthalmic mounting are to be assembled.

One of the principal objects of the invention is to provide improved means and method of locating the position at which holes are to be drilled in rimless ophthalmic lenses for receiving the lens straps or other fastening means by which the bridge, temples or other parts of the mounting are secured to the lenses.

Another object is to provide gauge means of the above character, which is simple in construction, and method of using the same whereby the positional relation at which the parts of an ophthalmic mounting are to be assembled may be quickly and easily located and designated.

Another object is to provide gauge means of the above character which is adapted particularly for use with lenses of different given sizes having substantially the same upper contour shapes whereby the position at which the holes to be drilled in said lenses for the attachment of lens connection means, either for a right or left lens, may be easily and quickly determined and marked.

Other objects and advantages of the invention will become apparent from the following description taken in connection with the accompanying drawing and it will be apparent that many changes and modifications may be made in the details of construction, arrangement of parts and method shown and described without departing from the spirit of the invention as expressed in the accompanying claims. I, therefore, do not wish to be limited to the exact details of construction, arrangement of parts and method shown and described as the preferred form only has been given by way of illustration.

Referring to the drawing:

Fig. I is a plan view of the device embodying the invention; and

Fig. II is a sectional view taken as on line II—II of Fig. I and looking in the direction indicated by the arrows.

The device embodying the invention is adapted particularly for use in locating the positional relation of the parts of a relatively new commercial construction of ophthalmic mounting. Such mountings embody lens supporting structures having relatively long and slender temple supports shaped substantially to follow the upper contour edges of the lenses. The lenses of such mountings are graded in standard sizes with the lenses of each respective size having substantially the same upper contour shape with their lower contour edges formed to different shapes. The relatively long and slender temple supports are graded in sizes and are preshaped to follow substantially the shapes of the upper contour edges of the respective lenses of different graded sizes. These relatively long and slender temple supports are connected to lens holding means or lens straps which are, in turn, attached to the lenses. In order to have the long and slender temple supports assume a proper fitted relation with the upper contour edges of the lenses, when the lens straps are in secured relation with said lenses, the position of attachment of the lens straps to the lenses must be carefully controlled. One of the principal objects, therefore, of the present invention is to provide simple, efficient and economical means and method of predetermining and marking the position on the lenses at which the connection openings or holes are to be drilled in said lenses for the attachment of the lens straps.

Referring more particularly to the drawing wherein like characters of reference designate like parts throughout the several views the device embodying the invention comprises broadly a base 1 having a gauge plate 2 secured thereto by any suitable means such as by cementing, or by mechanical means such as nails, screws or the like; depending upon the type of material used in forming said parts.

If the base 1 is of a soft material, such as wood, the said base, between the upper portion thereof and the gauge plate 2, is provided with a layer 3 of a relatively hard surfaced material such as Celluloid, Bakelite, artificial resin or any other suitable material which may be cleansed if soiled. This layer 3 is in the form of a relatively thin sheet which may be cemented or otherwise secured to the upper surface of the base 1. The said base 1 as well as the plate 2 may be formed entirely of such hard surfaced materials if desired. In the latter instance the base and plate may be integrally molded or cast of such materials through the use of moulding or casting dies having molding or casting portions of the detailed shape desired of the gauge.

The said gauge plate 2 is provided with a plurality of recesses 4 having contour edge portions 5 and 6 shaped to the same contour shape as the upper edge portions of respective lenses of different sizes with which the gauge is to be used. The sizes of the different groups of lenses with which the respective recesses 4 of the gauge is to be used is indicated at 7 on the gauge plate. The said sizes being designated as 38, 40, 42, 44 and 46. The edges 5 and 6 of the recesses form engagement means against which the right or left upper contour edge portion of the respective lenses 8 are adapted to be pressed and fitted, as illustrated diagrammatically by the full and dash lines in Fig. I. The portions 5 are adapted to receive the upper nasal edges of the lenses 8 which are to be used before the left eye, designated L as indicated at 9 and the edges 6 are adapted to receive the upper nasal edges of the lenses to be used before the right eye, designated R as indicated at 10.

The base 1, within each of the recessed areas 4, is provided with indication points 11 and 12 respectively located at predetermined spaced relation with the edges 5 and 6. The gauge point 11, as illustrated in Fig. I, determines the location at which the hole is to be drilled in the lens for the left eye and the gauge point 12 determines the location at which the hole is to be drilled in the lens for the right eye.

The method of determining the location at which the holes are to be drilled is performed by first pressing the lens, for example, for the left eye, into fitted relation with the edge portion 5 of the gauge plate. The location of the point 11 on the lens is marked on said lens by a suitable spotting tool 13 through the use of any commercially known spotting ink. This locates the drill position at which the lens strap attachment opening or hole is to be drilled in the lens. The upper edge of the lens for the right eye is pressed into fitted relation with the contour edge portion 6 of the gauge plate and the gauge point 12 functions similarly to the gauge point 11 in locating the position at which the attachment opening or hole is to be drilled in said lens. The lenses, as illustrated by the full and dash lines 8 in Fig. I, in this particular instnace, are of the commercially known 42 mm. type. The recess designated 42, as illustrated at 7, is therefore used. If the lenses are of the 40 mm. type, the 40 mm. recess is used; likewise the 38, 44 and 46 recess would be selected for the respective sizes of lenses. As stated above, ophthalmic mountings with which lenses having the characteristics set forth herein are to be used, particularly the supporting structure of said mountings, are provided with long and slender temple supports initially shaped and sized so as to readily fit and follow the upper contour shape of the respective lenses. To accomplish this result, when the lens straps are attached to the lenses, the drill position of the connection holes or openings must be accurately located on the lenses and the lens straps must be accurately fitted and attached to the lenses at said locations.

The long and slender temple supports of said supporting structures for said ophthalmic mountings are, for convenience, graded in lengths commercially designated A, B, C, D and E. The A length is to be used with 38 mm. lenses, B with 40, C with 42, D with 44 and E with 46 mm. lenses. Directly above the designations 38, 40, 42, 44 and 46 there is indicated, on the gauge plate 2, the letters A, B, C, D and E which provide means for readily designating which length of arm is to be used for that particular size of lens. These designations are clearly illustrated at 14 in Fig. I. On the other hand if a supporting structure having a known length of arm A, B, C, D or E is required for a particular individual, the size of lens required for said supporting structure may be determined by reference to the designation 7 adjacent the above mentioned letters on the gauge plate and the accurate drill positions of the connection openings in the respective lenses may be quickly and easily located and marked by placing the left lens in fitted relation with the contour edge portion 5 of the respective gauge recess 4 and marking the location of the gauge point 11 on the lens, and by placing the right lens in fitted relation with the contour edge portion 6 of said recess and marking the location of the gauge point 12 on said lens.

It is particularly pointed out that when fitting the lens 8 for the left or right eye, as the case may be, to the edge portion 5 or 6 of the gauge plate, the lens is placed on the upper surface portion of the base 1 with its concaved side towards said surface as illustrated in Fig. II.

The drill position is spotted on the lens in alignment with the gauge point 11 or 12 by a sharply pointed tool which has been dipped in spotting ink and the hole is drilled at said spot by any commercially known lens drill. After the hole is drilled in the lens, the lens strap, which may be of any commercially known type, is fitted to the lens and is attached thereto by suitable connection means such as a screw, pin or solder united connection means or other suitable holding means extending within the connection opening or hole drilled in the lens.

From the foregoing description it will be seen that simple, efficient and economical means and method has been provided for accomplishing all of the objects and advantages of the invention.

Having described my invention, I claim:

1. A device of the class described for determining the location at which a hole is to be drilled in a lens, comprising a base member and a gauge plate connected thereto, said gauge plate having a preshaped gauge recess with two symmetrical curves substantially identical one with the other, each of said symmetrical curves of the gauge recess preshaped to receive one lens of a pair of lenses, the straight line distance between the outer peripheral tips of the gauge recess being greater than the length of the horizontal meridian of either of the lenses of the pair of lenses which the gauge recess is adapted to receive, and an indicating means for each of said symmetrical curves.

2. A device of the class described for determining the location at which a hole is to be drilled in a lens, comprising a gauge plate having a recess therein with the bottom portion of said gauge plate being covered, said recess having a contour shape with two straight line portions disposed substantially opposite each other, and two curved portions each having one point thereof being substantially contiguous with one end of each of said straight line portions of the recess, said recess being adapted to receive independently a lens of a pair of lenses, and a single marking indicia located on the covered portion of the gauge plate for each curved portion of the recess, whereby one lens of a pair of lenses may be independently placed in the recess to indicate thereon the location of the hole to be drilled.

3. A device of the class described for determining the location at which a hole is to be drilled in a lens, comprising a gauge plate having a recess therein with the bottom portion of said gauge plate being covered, said recess having a contour shape with two straight line portions disposed substantially opposite each other, and two curved portions each having one point thereof being substantially contiguous with one end of each of said straight line portions of the recess, said recess being adapted to receive independently a lens of a pair of lenses, and a single marking indicia located on the covered portion of the gauge plate for each curved portion of the recess, the greatest width of said recess being materially wider than the greatest longitudinal meridian of either of the lenses to permit partial rotation of the lens to be marked within the recess.

4. A device of the class described for determining the location at which a hole is to be drilled in a lens, comprising a gauge plate, said gauge plate having a preshaped gauge recess with two symmetrical curves substantially identical one with the other, each of said symmetrical curves of the gauge recess preshaped to receive one lens of a pair of lenses, the straight line distance between the outer peripheral tips of the gauge recess being greater than the length of the horizontal meridian of either of the lenses of the pair of lenses which the gauge recess is adapted to receive, and an indicating means for each of said symmetrical curves.

5. A device of the class described for determining the location at which a hole is to be drilled in a lens, comprising a gauge plate having a recess therein, said recess having a contour shape with two straight line portions disposed substantially opposite each other, and two curved portions each having one point thereof being substantially contiguous with one end of each said straight line portions of the recess, said recess being adapted to receive independently a lens of a pair of lenses, and a single marking indicia located on the gauge plate for each curved portion of the recess, whereby one lens of a pair of lenses may be independently placed in the recess to indicate thereon the location of the hole to be drilled.

6. A device of the class described for determining the location at which a hole is to be drilled in a lens, comprising a gauge plate having a recess therein, said recess having a contour shape with two straight line portions disposed substantially opposite each other, and two curved portions each having one point thereof being substantially contiguous with one end of each of said straight line portions of the recess, said recess being adapted to receive independently a lens of a pair of lenses, and a single marking indicia located on the gauge plate for each curved portion of the recess, the greatest width of said recess being materially wider than the greatest longitudinal meridian of either of the lenses to permit partial rotation of the lens to be marked within the recess.

7. A device of the class described for determining the location at which a hole is to be drilled in a lens, comprising a gauge plate having a preshaped gauge recess therein, said preshaped gauge recess corresponding to a definite size standard of lens and having a contour shape with two symmetrical portions substantially identical one with the other, each of said symmetrical portions of the gauge recess preshaped to receive a corresponding preshaped portion of one lens of a pair of lenses, and indicating means located on the gauge plate for each of the symmetrical portions of the recess, the greatest width of said recess being wider than the greatest longitudinal meridian of the lens to be drilled to permit the left and right lens of a pair of lenses of a standard size to engage the left and right corresponding symmetrical portions of the recess.

LAWRENCE L. LEWIS.